United States Patent [19]

Lutz et al.

[11] Patent Number: 4,795,782
[45] Date of Patent: Jan. 3, 1989

[54] IMPACT RESISTANT BLENDS OF THERMOPLASTIC POLYAMIDES, FUNCTIONALIZED POLYOLEFINS AND FUNCTIONALIZED ELASTOMERS

[75] Inventors: Robert G. Lutz, Spring; Richard Gelles; William P. Gergen, both of Houston, all of Tex.

[73] Assignee: Shell Oil Company, Houston, Tex.

[21] Appl. No.: 911,555

[22] Filed: Sep. 25, 1986

[51] Int. Cl.$^4$ .............................................. C08L 77/00
[52] U.S. Cl. ........................................ 525/66; 525/92; 525/179
[58] Field of Search ...................................... 525/92, 66

[56] References Cited

U.S. PATENT DOCUMENTS

| 2,071,250 | 2/1937 | Carothers | 260/106 |
|---|---|---|---|
| 2,071,251 | 2/1937 | Carothers | 18/54 |
| 2,130,523 | 9/1938 | Carothers | 260/124 |
| 2,130,948 | 9/1938 | Carothers | 18/54 |
| 2,241,322 | 5/1941 | Hanford | 260/78 |
| 2,312,966 | 3/1943 | Hanford | 260/78 |
| 2,512,606 | 6/1950 | Bolton et al. | 260/78 |
| 3,112,300 | 11/1963 | Natta et al. | 260/93.7 |
| 3,113,986 | 12/1963 | Breslow et al. | 260/683.9 |
| 3,251,905 | 5/1966 | Zelinski | 260/879 |
| 3,265,765 | 8/1966 | Holden et al. | 260/866 |
| 3,390,207 | 6/1968 | Moss et al. | 260/879 |
| 3,393,210 | 7/1968 | Speck | 260/371 |
| 3,598,887 | 8/1971 | Darcy et al. | 260/879 |
| 3,639,521 | 2/1972 | Hsieh | 260/880 |
| 4,110,303 | 8/1978 | Gergen et al. | 525/92 |
| 4,174,358 | 11/1979 | Epstein | 525/183 |
| 4,208,356 | 6/1980 | Fukawa et al. | 525/89 |
| 4,219,627 | 8/1980 | Halasa et al. | 525/89 |
| 4,226,952 | 10/1980 | Halasa et al. | 525/192 |
| 4,362,846 | 12/1982 | Korber et al. | 525/66 |
| 4,381,366 | 4/1983 | Sanderson et al. | 525/66 |
| 4,427,828 | 1/1984 | Hergenrother et al. | 525/66 |
| 4,578,429 | 3/1986 | Gergen et al. | 525/291 |
| 4,657,970 | 4/1987 | Shiraki et al. | 525/92 |

FOREIGN PATENT DOCUMENTS 0170665  9/1985  Japan ..................................... 525/66

Primary Examiner—John C. Bleutge
Assistant Examiner—A. Carrillo

[57] ABSTRACT

The present invention relates to an impact resistant polymeric composition comprising a polyamide, a functionalized polyolefin and a functionalized elastomer.

25 Claims, No Drawings

IMPACT RESISTANT BLENDS OF THERMOPLASTIC POLYAMIDES, FUNCTIONALIZED POLYOLEFINS AND FUNCTIONALIZED ELASTOMERS

The present invention relates to an impact resistant polymeric composition comprising a polyamide, a functionalized polyolefin and a functionalized elastomer.

BACKGROUND

This application is related to application Ser. Nos. 911,556, now abandoned; 911,557, now abandoned; 911,558, now abandoned; and 911,559 which were filed on Sept. 25, 1986 concurrently with the present application.

Thermoplastic polyamides, such as nylon 6,6, are a class of materials which possess a good balance of properties comprising strength and stiffness which make them useful as structural materials. However, for a particular application, a thermoplastic polyamide may not offer the combination of interest.

One major deficiency of thermoplastic polyamides is their poor resistance to impact, especially when dry. A particularly appealing route to achieving improved impact resistance in a thermoplastic is by blending it with another polymer. It is well known that stiff plastics can often be impact modified by addition of an immiscible low modulus elastomer. However, in general, physical blending of polymers has not been a successful route to toughen thermoplastic polyamides. This is due to the poor adhesion immiscible polymers typically exhibit with each other. As a result, interfaces between blend component domains represent areas of severe weaknesses, providing natural flows which result in facile mechanical failure.

A route to achieve interfacial adhesion between dissimilar materials is by chemically attaching to one or more of the materials functional moieties which enhance their interaction. Such interactions include chemical reaction, hydrogen bonding, and dipole-dipole interactions.

It has been previously proposed to increase the impact strength of polyamides by addition of a modified block copolymer. Hergenrother et al in U.S. Pat. No. 4,427,828 and Shiraki et al in International Kokai Application No. WO83/00492 disclose blends of thermoplastic polyamide with a modified block copolymer. These blends are deficient, however, because the blended components, especially the block copolymer, are relatively expensive. Also, polyamides have a tendency to absorb water and consequently properties are degraded. Blending polyolefins with polyamides would decrease the water absorption for the blend since a portion of the polyamide which absorbs water would be replaced by polyolefin which absorbs relatively little water. In the past attempts to extend impact modified polyamides with polyolefins have been unsuccessful because the polyamides were incompatible with the polyolefins.

It has been discovered that by functionalizing various components in a polyamide-polyolefin-elastomer blend a desirable combination of properties and cost can be obtained.

SUMMARY OF THE INVENTION

According to the present invention, there is provided an impact resistant blend of a thermoplastic polyamide, a polyolefin and an elastomer. More particularly there is provided impact resistant polymeric compositions comprising (a) from 1 to 95 percent by weight of a polyamide having a number average molecular weight of at least 5000; and
(b) from 1 to 95 percent by weight of a polyolefin to which has been grafted an acid compound or its derivative;
(c) from 1–50 percent by weight of an elastomer to which has been grafted an acid compound or its derivative.

DETAILED DESCRIPTION OF THE INVENTION

Polyamides

The polyamide matrix resin of the toughened compositions of this invention is well known in the art and embraces those semi-crystalline and amorphous resins having a molecular weight of at least 5000 and commonly referred to as nylons. Suitable polyamides include those described in U.S. Pat. Nos. 2,071,250; 2,071,251; 2,130,523; 2,130,948; 2,241,322; 2,312,966; 2,512,606; and 3,393,210. The polyamide resin can be produced by condensation of equimolar amounts of a saturated dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Examples of polyamides include polyhexamethylene adipamide (nylon 66), polyhexamethylene azelaamide (nylon 69), polyhexamethylene sebacamide (nylon 610), and polyhexamethylene dodecanoamide (nylon 612), the polyamide produced by ring opening of lactams, i.e., polycaprolactam, polylauric lactam, poly-11-aminoundecanoic acid, bis(paraaminocyclohexyl) methane dodecanoamide. It is also possible to use in this invention polyamides prepared by the copolymerization of two of the above polymers or terpolymerization of the above polymers or their components, e.g., for example, an adipic isophthalic acid hexamethylene diamine copolymer. Preferably the polyamides are linear with a melting point in excess of 200° C. As great as 99 percent by weight of the composition can be composed of polyamide; however, preferred compositions contain from 60 to 99 percent, and more narrowly 80 to 95 percent, by weight of polyamide.

Polyolefins

The polyolefins employed in the instant invention are cyrstalline or crystallizable poly(alpha-olefins) and their copolymers. The alpha-olefin or 1-olefin monomers employed in the instant invention have 2 to 5 carbon atoms.

Examples of suitable polyolefins, both plastic and elastomeric, include low or high density polyethylene, polypropylene, polybutene-1, poly-3-methylbutene-1, poly-4-methylpentene-1, copolymers of monoolefins with other olefins (mono- or diolefins) or vinyl monomers such as ethylene-propylene copolymers or with one or more additional monomers, i.e., EPDM, ethylene/butylene copolymer, ethylene/vinyl acetate copolymer, ethylene/ethyl acrylate copolymer, propylene/4-methylpentene-1 copolymer, ethylene/methacrylic acid, ethylene/acrylic acid and their ionomers and the like. The number average molecular weight of the polyolefins is preferably above about 10,000, more preferably above about 50,000. In addition, it is preferred that the apparent crystalline melting point be above about 100° C., preferably between about 100° C. and about 250° C., and more preferably between about 140° C. and about 250° C. The preparation of these various polyolefins are well known. See generally "Olefin Polymers," Volume 14, Kirk-Othmer Encyclopedia of Chemical Technology, pages 217–335 (1967).

The high density polyethylene employed has an approximate crystallinity of over about 75% and a density in grams per cubic centimeter (g/cm$^3$) of between about 0.94 and 1.0 while the low density polyethylene employed has an approximate crystallinity of over about 35% and a density of between about 0.90 g/cm$^3$ and 0.94 g/cm$^3$. Most commercial polyethylenes have a number average molecular weight of about 50,000 to about 500,000.

The polypropylene employed is the so-called isotactic polypropylene as opposed to atactic polypropylene. This polypropylene is described in the above Kirk-Othmer reference and in U.S. Pat. No. 3,112,300. The number average molecular weight of the polypropylene employed is typically in excess of about 100,000. The polypropylene suitable for this invention may be prepared using methods of the prior art. Depending on the specific catalyst and polymerization conditions employed, the polymer produced may contain atactic as well as isotactic, syndiotactic or so-called stereo-block molecules. These may be separated, if desired, by selective solvent extraction to yield products of low atactic content that crystallize more completely. The preferred commercial polypropylenes are generally prepared using a solid, crystalline, hydrocarbon-insoluble catalyst made from a titanium trichloride composition and an aluminum alkyl compound, e.g., triethyl aluminum or diethyl aluminum chloride. If desired, the polypropylene employed may be a copolymer containing minor (1 to 20 percent by weight) amounts of ethylene or other alpha-olefin comonomers.

The poly(1-butene) preferably has an isotactic structure. The catalysts used in preparing the poly(1-butene) are typically organometallic compounds commonly referred to as Ziegler-Natta catalysts. A typical catalyst is the interacted product resulting from mixing equimolar quantities of titanium tetrachloride and triethylaluminum. The manufacturing process is normally carried out in an inert diluent such as hexane. Manufacturing operation, in all phases of polymer formation, is conducted in such a manner as to guarantee rigorous exclusion of water even in the trace amounts.

One very suitable polyolefin is poly(4-methyl-1-pentene). Poly(4-methyl-1-pentene) typically has an apparent crystalline melting point of between about 240° and 250° C. and a relative density of between about 0.80 and 0.85. Monomeric 4-methyl-1-pentene is commercially manufactured by the alkali-metal catalyst dimerization of propylene. The homopolymerization of 4-methyl-1-pentene with Ziegler-Natta catalysts is described in the Kirk-Othmer Encyclopedia of Chemical Technology, Supplement volume, pages 789–792 (second edition, 1971). However, the isotactic homopolymer of 4-methyl-1-pentene has certain technical defects, such as brittleness and inadequate transparency. Therefore, commercially available poly(4-methyl-1-pentene) is actually a copolymer with minor proportions of other alpha-olefins, together with the addition of suitable oxidation and melt stabilizer systems. These copolymers are described in the Kirk-Othmer Encyclopedia of Chemical Technology, Supplement volume, pages 792–907 (second edition, 1971), and are available from Mitsui Chemical Company under the tradename TPX ® resin. Typical alpha-olefins are linear alpha-olefins having from 4 to 18 carbon atoms. Suitable resins are copolymers of 4-methyl-1-pentene with from about 0.5 to about 30% by weight of a linear alpha-olefin.

If desired, the polyolefin may be a mixture of various polyolefins. However, the much preferred polyolefin is isotactic polypropylene.

FUNCTIONALIZED POLYOLEFINS

The modified polyolefins suitable for use in the present invention are prepared by reacting a polyolefin with an unsaturated mono or polycarboxylic acid, or derivatives thereof.

The modified polyolefins are readily prepared according to the procedure described in U.S. Pat. No. 3,480,580 or U.S. Pat. No. 3,481,910. The polyolefins which can be modified are prepared from monoolefins containing at least 2 carbon atoms. Such polyolefins include homopolymers and copolymers of propylene, butene-1, 4-methyl-1-pentene, 3-methyl-1-butene, 4,4-dimethyl-1-pentene, 3-methylpentene-1, 4-methylhexene-1, 5-ethylhexene-1, 6-methylheptene-1, hexene-1, heptene-1, octene-1, nonene-1, decene-1, and dodecene-1 and the like.

Examples of suitable polyolefins, both plastic and elastomeric, include low or high density polyethylene, polypropylene, polybutene-1, poly-4-methylpentene-1, ethylene-propylene copolymers or with one or more additional monomers, for example EPDM, ethylene-butylene copolymers, ethylene-vinyl acetate copolymers, ethylene/ethyl acrylate copolymers, propylene/4-methylpentene-1 copolymers and the like.

The reaction of the polyolefin, which for ease of reaction is generally a low viscosity polyolefin, with an unsaturated mono or polycarboxylic acid, and derivatives thereof, can be carried out in the presence of a free radical source. These homopolymeric or copolymeric low viscosity poly-α-olefins are prepared by thermally degrading conventional high molecular weight α-olefin polymers prepared by conventional polymerization processes. For example, one such suitable conventional polymer is the highly crystalline polypropylene prepared according to U.S. Pat. No. 2,969,345. Thermal degradation of conventional homopolymers or copolymers is accomplished by heating them at elevated temperatures causing the polymer chain to rupture apparently at the points of chain branching of the polymeric material. The degree of degradation is controlled by reaction time and temperature to give a thermally degraded low molecular weight crystallizable polymeric material having a melt viscosity range from about 100–5,000 cp. at 190° C. (ASTMD12 38-57T using 0.04+0.0002 inch orifice) and an inherent viscosity of about 0.1 to 0.5, [Schulken and Sparks, *Journal Polymer Science* 26 227, (1957)]. By carefully controlling the time, temperature and agitation, a thermally degraded poly-α-olefin of relatively narrower molecular weight range than the starting high molecular weight polymer is obtained. The degradation is carried out at a temperature from 290° C. to about 425° C.

The low viscosity poly-α-olefins are characterized by having a melt viscosity of less than about 100 to 5,000 cp. as measured at 190° C. (ASTM-D12 38-57T using 0.04±0.0002 inch orifice). These low viscosity poly-α-olefins are reacted with unsaturated mono or polycarboxylic acids, and derivatives thereof, at temperatures generally less than 300° C., preferably from about 150°–250° C. in the presence of free radical sources. Suitable free radical sources are, for example peroxides such as ditertiary butyl peroxide, tertiary butyl hydroperoxide, cumene hydroperoxide, p-menthane peroxide, p-menthane hydroperoxide compounds or azo compounds, such as azobis(isobutyronitrile), or irradiation sources. Suitable irradiation sources include, for example, those from cobalt, uranium, thorium, and the like and ultraviolet light. Preferably, about 1 to 10 percent organic unsaturated polycarboxylic acid, anhydride or esters thereof, based on the weight of the low viscosity polyolefin, can be used. The amount of peroxide or free radical agent used is generally quite low being of the order of about 0.01 to about 0.5 percent based on the weight of the low viscosity poly-α-olefin. The reaction may be carried out either in a batchwise or in a continuous manner with contact times in the order of about 10 minutes to about 2 hours. Suitable unsaturated mono or polycarboxylic acids and derivatives thereof are described later in the section entitled Functionalized Block Copolymers and include maleic acid, maleic anhydride, fumaric acid, citaconic anhydride, aconitric anhydride, itaconic anhydride, the half or full esters derived from methyl, ethyl, dimethyl maleate, dimethyl fumarate, methyl ethyl maleate, dibutyl maleate, dipropyl maleate, and the like, or those compounds which form these compounds at elevated reaction temperatures such as citric acid, for example. These modified low molecular weight poly-α-olefin compositions have a melt viscosity of 100–5,000 centipoise at 190° C. and a saponification number of from at least 6 to about 60, preferably about 7–30. It has been observed that the melt viscosity of the product increases slightly. This increase in melt viscosity may be due to a slight degree of crosslinking or to copolymerization of the wax material with maleic anhydride.

The reaction of the polyolefin can also be carried out in an extruder or a Banbury mixer. This process can be used for reacting polyolefins having a melt viscosity greater than 5,000 cp. at 190° C. up to a viscosity of 500,000 cp. at 190° C. The modified polyolefins prepared in this manner, such as polypropylene, can have a melt viscosity of 150,000 or higher cp. at 190° C. and a saponification number of up to 60.

One method for the determination of saponification number of maleated polypropylene is as follows: Weigh approximately 4 g of the sample into a 500 ml alkali-resistant Erlenmeyer flask and add 1,000 ml distilled xylene. Heat under a reflux condenser for 1 hour. Cool the solution to 75° C. or less, and add from a buret 30 ml standardized 0.10N KOH in ethyl alcohol. Heat under reflux for 45 min. Cool, and add from a buret standardized 0.10N $CH_3COOH$ in xylene until the mixture is acid to phenolphthalein. Add at least 1 ml excess $CH_3COOH$. Reheat the solution under reflux for 15 min. Remove from heat, add 5 ml water, and titrate to a faint pink end point with 0.10N KOH in ethyl alcohol. Run a blank in this manner using the same amounts of reagents and the same heating times. Calculation:

reaction mixture with an inert gas while the melt temperature is between 200° and 300° C. After the unreacted unsaturated polycarboxylic acid has been removed, the modified poly-α-olefin can be further purified by vacuum stripping, solvent extraction, or dissolving in a hydrocarbon medium and isolated by precipitation with a nonsolvent such as acetone.

It may be desirable to use an effective polyolefin stabilizer in order to prevent gelation or degradation of blend properties. Some suitable stabilizers include diauryl thiodipropionate, butylated hydroxytoluene, dioctadecyl p-cresol, pentaerythritol tetrakis[3-(3,5-di-tert-butyl-4-hydroxyphenyl)propionate], dodecyl stearyl thiodipropionate, 2,2'-methylene bis(6-tert-butyl-p-cresol) and the like or combinations of such stabilizers. Desirable stabilizer concentrations include about 0.05 to about 1.0 percent of stabilizer, by weight, to the blend.

If desired, the functionalized polyolefin may be mixed with unfunctionalized polyolefins, for example, a highly functionalized polyolefin may be diluted with unfunctionalized polyolefin to improve properties or reduce cost.

ELASTOMERS

Elastomers useful in the blends of the present inventory may include elastomeric olefin copolymers, selectively hydrogenated block copolymers and elastomeric acrylic containing polymers made by the emulsion process. These elastomers may or may not be functionalized.

ACRYLIC MODIFIERS

Elastomeric acrylic containing polymers are well known in the art and are described in U.S. Pat. Nos. 3,668,274 and 4,584,344.

ELASTOMERIC OLEFIN COPOLYMERS

Elastomeric copolymers of ethylene, at least one $C_3$ to $C_6$ α-monoolefin, and at least one nonconjugated diene are well known in the art. These copolymers have a substantially saturated hydrocarbon backbone chain which causes the copolymer to be relatively inert to ozone attack and oxidative degradation and have side-chain unsaturation available for sulfur curing.

These copolymers are conveniently prepared by copolymerizing the monomers in the presence of a coordination catalyst system such as diisobutylaluminum chloride and vanadium oxytrichloride. Copolymerization may be conducted in an inert solvent or in a slurry or particle form reactor. Details of their preparation are given, for example, in U.S. Pat. Nos. 2,933,480; 2,962,451; 3,000,866; 3,093,620; 3,093,621; 3,063,973; 3,147,230; 3,154,528; 3,260,708; and M. Sittig, "Stereo Rubber and Other Elastomer Processes," Noyes Development Corporation, Park Ride, N.J. 1967.

Propylene is normally selected as the α-monoolefin in preparing such copolymers because of its availability and for reasons of economics. Other lower α-monoolefins, such as 1-butene, 1-pentene, and 1-hexene can be selected in place of or in addition to propylene in preparing elastomeric copolymers which are useful in prac- $$\frac{[(\text{ml. KOH} \times N)(\text{ml. CH}_3\text{COOH} \times N)]_{\text{For Sample}} - [(\text{ml. KOH} \times N)(\text{ml. CH}_3\text{COOH} \times N)]_{\text{For Blank}} \times 56.1}{\text{g. Sample}} = \text{Sap. No.}$$

The unreacted, unsaturated polycarboxylic acid can be separated from the reaction mixture by purging the ticing the invention. The term EPDM as used herein refers to the preferred copolymers of ethylene, propylene, and at least one nonconjugated diene.

An especially preferred class of EPDM is that in which the nonconjugated diene is monoreactive. Monoreactive nonconjugated dienes have one double bond which readily enters the copolymerization reaction with ethylene and propylene, and a second double bond which does not, to any appreciable extent, enter the copolymerization reaction. Copolymers of this class have maximum side chain unsaturation for a given diene content, which unsaturation is available for adduct formation. Gel content of these copolymers is also minimal since there is minimal cross-linking during copolymerization.

Monoreactive nonconjugated dienes which can be selected in preparing this preferred class of EPDM copolymer include linear aliphatic dienes of at least six carbon atoms which have one terminal double bond and one internal double bond, and cyclic dienes wherein one or both of the carbon-to-carbon double bonds are part of a carbocyclic ring. Of the linear dienes, copolymers of ethylene, propylene, and 1,4-hexadiene having an inherent viscosity of at least about 1.5 are especially preferred.

Classes of cyclic dienes useful in preparing the preferred class of EPDM copolymers for adduct formation include alkylidene bicycloalkenes, alkenyl bicycloalkenes, bicycloalkadienes, and alkenyl cycloalkenes. Representative of alkylidene bicycloalkenes are 5-alkylidene-2-norbornenes such as 5-ethylidene-2-norbornene and 5-methylene-2-norbornene. Representative of alkenyl bicycloalkenes are 5-alkenyl-2-norbornenes such as 5-(1'-propenyl)-2-norbornene, 5-(2'-butenyl)-2-norbornene, and 5-hexenyl-2-norbornene. Dicyclopentadiene and 5-ethyl-2,5-norbornadiene are illustrative of bicycloalkadienes, and vinyl cyclohexane is representative of alkenyl cycloalkenes which may be selected as the diene monomer. EPDM copolymers prepared from cyclic dienes preferably have an inherent viscosity within the range of about 1.5 to 3.0, as measured on 0.1 gram copolymer dissolved in 100 milliliters of perchloroethylene at 30° C., for optimum processing properties. Of the cyclic dienes, 5-ethylidene-2-norbornene is preferred.

Another class of preferred copolymers includes branched tetrapolymers made from ethylene, at least one $C_3$ to $C_6$ α-monoolefin with propylene being preferred, at least one monoreactive nonconjugated diene, and at least one direactive nonconjugated diene such as 2,5-norbornadiene or 1,7-octadiene. By "direactive" is meant that both double bonds are capable of polymerizing during preparation of the copolymer. Tetrapolymers of this class preferably have an inherent viscosity of about 1.2 to 3.0, as measured on 0.1 gram copolymer dissolved in 100 milliliters of perchloroethylene at 30° C., for optimum processing properties. A preferred copolymer of this class is a tetrapolymer of ethylene, propylene, 1,4-hexadiene, and 2,5-norbornadiene. Such copolymers are described in Canadian Patent Nos. 855,774 and 897,895.

Copolymers of the classes defined above have low gel content, a substantially saturated hydrocarbon backbone which is resistant to ozone and oxidative degradation, and hydrocarbon side-chain unsaturation which presents sites for the thermal addition of maleic anhydride, fumaric acid, and other species capable of thermal addition to the above-mentioned side-chain unsaturation. Low gel content is indicative of a polymer having favorable processing properties.

Although the present invention will be discussed in relationship to thermal addition of maleic anhydride to from a graft, it is understood that in the present invention maleic acid or fumaric acid may be directly substituted for maleic anhydride to form the same adduct. The adduct containing succinic groups attached to the elastomeric copolymer contains these groups with use of a starting material of maleic anhydride, maleic acid or fumaric acid. Maleic anhydride, maleic acid and fumaric acid are equivalents to one another to produce the same type of graft containing the same succinic groups. Therefore, the remarks made herein in use of maleic anhydride also refer to maleic acid and fumaric acid. Also, the use of other thermal addition reactions with this hydrocarbon side-chain unsaturation may be used for the present invention.

Using a copolymer of ethylene, propylene, and 1,4-hexadiene, thermal addition of maleic anhydride to the copolymer is theorized to occur by the following equation:

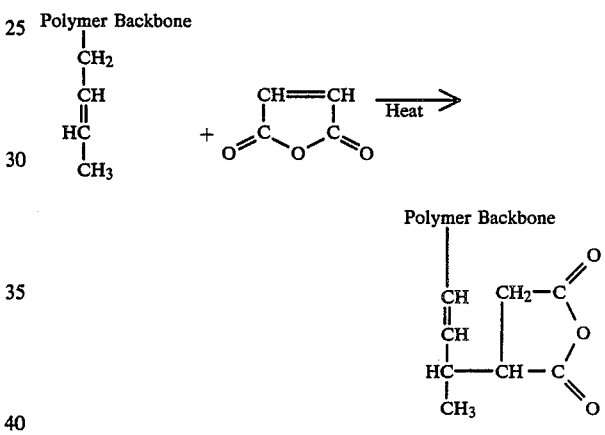

A molecule of maleic anhydride adds to the polymer at the site of side chain unsaturation to give a succinic anhydride radical bonded to the side chain. Said chain unsaturation shifts by one carbon atom. It will be understood that side chain unsaturation can also shift away from the backbone chain when the unsaturation is several carbon atoms removed from the terminal side chain carbon atom, as in copolymers of ethylene, propylene, and 1,4-octadiene.

However, it has been further found that in addition to the adduct containing succinic anhydride attached to the elastomeric copolymer, succinic acid groups can also be attached to the copolymer. Generally the adduct will contain succinic groups attached to the copolymer as a mixture of succinic anhydride and succinic acid.

In this disclosure "succinic groups" will include succinic anhydride, succinic acid or a combination of succinic anhydride and succinic acid.

The adducts of this invention can be prepared by any process which intimately mixes maleic anhydride with the copolymer without appreciable generation of free radicals, and which concurrently or subsequently heats the mixture to a temperature whereat thermal addition occurs. Selected temperatures will generally be at least 225° C. to obtain adduct formation at acceptable rates and less than about 350° C. to avoid any significant polymer breakdown. Preferred temperature ranges will vary with the particular polymer and can readily be determined by one skilled in the art.

Mixing of the maleic anhydride and copolymer can be by blending molten anhydride with copolymer in an internal mixer or extruder, or by blending finely divided dry maleic anhydride with copolymer on a well-ventilated rubber mill with concurrent or subsequent heating, such as in a hot press or mold. Temperatures necessary to achieve thermal grafting are sufficiently high to dehydrate maleic acid, forming maleic anhydride in situ. Thus, maleic acid can be compounded with the copolymer instead of maleic anhydride when such is desired. The maleic anhydride can be substituted with groups, such as bromine or chlorine, which do not unduly interfere with the graft reaction.

Preferred copolymers of ethylene, propylene, and 1,4-hexadiene are very resistant to free radical formation under high shear stress conditions and are readily mixed on conventional bulk processing equipment without gel formation. Care must be exercised, however, in selecting the mixing conditions for copolymers derived from strained ring dienes such as ethylidene norbornene. Such copolymers will readily generate free radicals when sheared at low temperatures, and are preferably mixed with maleic anhydride at high temperature, such as above 90° C. to avoid appreciable gel formation.

It is generally desired to form adducts containing about 0.02 to 20% and preferably about 0.1 to 10%, by weight maleic anhydride. Adducts containing such quantities of maleic anhydride have sufficient carboxylated sites for ionic curing or grafting of the copolymer. To achieve a desired degree of adduct formation within a reasonable time, high concentrations of reactants are helpful. One will generally select a polymer having about twice the amount of side-chain unsaturation as is stoichiometrically required for the desired amount of maleic anhydride incorporation. Similarly, about twice as much maleic anhydride is added as is desired in the polymer adduct. Conversion of about 40 to 50% of the maleic anhydride will result in copolymer adduct having the desired composition. For example, if one desires to obtain an ethylene/propylene/1,4-hexadiene copolymer having 2.2 weight percent maleic anhydride content, he could conveniently mix a copolymer having 0.49 moles side-chain unsaturation per kilogram of polymer with 0.49 moles maleic anhydride and heat the mixture to convert 45% of the anhydride, thereby obtaining the desired product.

It is often desirable to perform further reactions on the derivatized elastomeric olefin copolymer. For example, a copolymer containing succinic groups may be esterified with hydroxy-containing compounds.

SELECTIVELY HYDROGENATED BLOCK COPOLYMER

Block copolymers of conjugated dienes and vinyl aromatic hydrocarbons which may be utilized include any of those which exhibit elastomeric properties and those which have 1,2-microstructure contents prior to hydrogenation of from about 7% to about 100%. Such block copolymers may be multiblock copolymers of varying structures containing various ratios of conjugated dienes to vinyl aromatic hydrocarbons including those containing up to about 60 percent by weight of vinyl aromatic hydrocarbon. Thus, multiblock copolymers may be utilized which are linear or radial symmetric or asymmetric and which have structures represented by the formulae A-B, A-B-A, A-B-A-B, B-A-B, $(AB)_{0,1,2}$ . . . BA and the like wherein A is a polymer block of a vinyl aromatic hydrocarbon or a conjugated diene/vinyl aromatic hydrocarbon tapered copolymer block and B is a polymer block of a conjugated diene.

The block copolymers may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,887 and 4,219,627. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356 the disclosures of which are incorporated herein by reference.

Conjugated dienes which may be utilized to prepare the polymers and copolymers are those having from 4 to 8 carbon atoms and include 1,3-butadiene, 2-methyl-1,3-butadiene (isoprene), 2,3-dimethyl-1,3-butadiene, 1,3-pentadiene, 1,3-hexadiene, and the like. Mixtures of such conjugated dienes may also be used. The preferred conjugated diene is 1,3-butadiene.

Vinyl aromatic hydrocarbons which may be utilized to prepare copolymers include styrene, o-methylstyrene, p-methylstyrene, p-tert-butylstyrene, 1,3-dimethylstyrene, alpha-methylstyrene, vinylnaphthalene, vinylanthracene and the like. The preferred vinyl aromatic hydrocarbon is styrene.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process. The hydrogenation of these polymers and copolymers may be carried out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, the disclosures of which are incorporated herein by reference. The polymers and copolymers are hydrogenated in such a manner as to produce hydrogenated polymers and copolymers having a residual unsaturation content in the polydiene block of from about 0.5 to about 20 percent of their original unsaturation content prior to hydrogenation.

FUNCTIONALIZED BLOCK COPOLYMERS

In general, any materials having the ability to react with the base block copolymer, in free radical initiated reactions or thermal addition reactions are operable for the purposes of the invention.

Monomers may be polymerizable or nonpolymerizable, however, preferred monomers are nonpolymerizable or slowly polymerizing. U.S. Pat. No. 4,427,828 discloses block copolymers made by the thermal addition reaction. Free radically produced block copolymers and free radical methods are disclosed in U.S. patent applications Ser. Nos. 646,391; 646,389; and 657,294 which are herein incorporated by reference.

In free radical reactions the monomers must be ethylenically unsaturated in order to be graftable. We have found that by grafting unsaturated monomers which have a slow polymerization rate the resulting graft copolymers contain little or no homopolymer of the unsaturated monomer and contain only short grafted monomer chains which do not phase separate into separate domains.

The class of preferred monomers which will form graft polymers within the scope of the present invention have one or more functional groups or their derivatives such as carboxylic acid groups and their salts, anhydrides, esters, imide groups, amide groups, acid chlorides and the like in addition to at least one point of unsaturation.

These functionalities can be subsequently reacted with other modifying materials to produce new functional groups. For example a graft of an acid-containing monomer could be suitably modified by esterifying the resulting acid groups in the graft with appropriate reaction with hydroxy-containing compounds of varying carbon atoms lengths. The reaction could take place simultaneously with the grafting or in a subsequent post modification reaction.

The grafted polymer will usually contain from 0.02 to 20, preferably 0.1 to 10, and most preferably 0.2 to 5 weight percent of grafted portion.

The preferred modifying monomers are unsaturated mono- and polycarboxylic-containing acids ($C_3$–$C_{10}$) with preferably at least one olefinic unsaturation, and anhydrides, salts, esters, ethers, amides, nitriles, thiols, thioacids, glycidyl, cyano, hydroxy, glycol, and other substituted derivatives from said acids.

Examples of such acids, anhydrides and derivatives thereof include maleic acid, fumaric acid, itaconic acid, citraconic acid, acrylic acid, glycidyl acrylate, cyanoacrylates, hydroxy $C_1$–$C_{20}$ alkyl methacrylates, acrylic polyethers, acrylic anhydride, methacrylic acid, crotonic acid, isocrotonic acid, mesaconic acid, angelic acid, maleic anhydride, itaconic anhydride, citraconic anhydride, acrylonitrile, methacrylonitrile, sodium acrylate, calcium acrylate, and magnesium acrylate.

Other monomers which can be used either by themselves or in combination with one or more of the carboxylic acids or derivatives thereof include $C_2$–$C_{50}$ vinyl monomers such as acrylamide, acrylonitrile and monovinyl aromatic compounds, i.e. styrene, chlorostyrenes, bromostyrenes, α-methyl styrene, vinyl pyridines and the like.

Other monomers which can be used are $C_4$ to $C_{50}$ vinyl esters, vinyl ethers and allyl esters, such as vinyl butyrate, vinyl laurate, vinyl stearate, vinyl adipate and the like, and monomers having two or more vinyl groups, such as divinyl benzene, ethylene dimethacrylate, triallyl phosphite, dialkylcyanurate and triallyl cyanurate.

The preferred monomers to be grafted to the block copolymers according to the present invention are maleic anhydride, maleic acid, fumaric acid and their derivatives. It is well known in the art that these monomers do not polymerize easily.

Of course, mixtures of monomer can be also added so as to achieve graft copolymers in which the graft chains at least two different monomers therein (in addition to the base polymer monomers).

The modified block copolymer for blending according to the present invention may be prepared by any means known in the art, for example, graft-reacting an acid moiety or its derivative with an aromatic vinyl compound-conjugated diene compound block copolymer containing at least one polymer block AB mainly composed of a conjugated diene compound at least one polymer block BA mainly composed of an aromatic vinyl compound, wherein said graft reaction is carried out by melt or solution mixing said block copolymer and said acid moiety in the presence of a free radical initiator and wherein each A is a polymerized monoalkenyl aromatic hydrocarbon block having an average molecular weight of about 2,000 to 115,000; each B is a polymerized conjugated diene hydrocarbon block having an average molecular weight of about 20,000 to 450,000; the blocks A constitute 5–95 weight percent of the copolymer; 40–55 mol percent of the condensed butadiene units in block B have a 1,2-configuration; the unsaturation of the block B is reduced to less than 10% of the original unsaturation; and the unsaturation of the A blocks is above 50% of the original unsaturation.

PREPARATION OF THE FINAL COMPOSITIONS

The toughened compositions of this invention can be prepared by melt blending, in a closed system, a polyamide, a polyolefin and an elastomer into a uniform mixture in a multi-screw extruder such as a Werner Pfleiderer extruder having generally 2–5 kneading blocks and at least one reverse pitch to generate high shear, or other conventional plasticating devices such as a Brabender, Banbury mill, or the like. Alternatively, the blends may be made by coprecipitation from solution, blending or by dry mixing together of the components followed by melt fabrication of the dry mixture by extrusion.

Another method of preparing the blend would be to functionalize the elastomer in the presence of the polyolefin as described in U.S. patent application Ser. No. 911,559 filed concurrently herewith.

The modified polyamide resin may be prepared by melt-blending from about 1 percent to about 95 percent by weight preferably from about 10 percent to about 70 percent or more preferably 15 percent to about 45 percent of the polyamide, from about 1 percent to about 95 percent by weight, preferably from about 15 to about 65 percent or more preferably from 30 to about 55 percent of a polyolefin, and from about 1 percent to about 50 percent by weight preferably from about 15 percent to about 35 percent or more preferably 10 percent to about 25 percent of an elastomer.

The compositions of the invention may be modified by one or more conventional additives such as stabilizers and inhibitors of oxidative, thermal, and ultraviolet light degradation; lubricants and mold release agents, colorants including dyes and pigments, fibrous and particulate fillers and reinforcements, nucleating agents, plasticizers, etc.

The stabilizers can be incorporated into the composition at any stage in the preparation of the thermoplastic composition. Preferably the stabilizers are included early to preclude the initiation of degradation before the composition can be protected. Such stabilizers must be compatible with the composition.

The oxidative and thermal stabilizers useful in the materials of the present invention include those used in addition polymers generally. They include, for example, up to 1 percent by weight, based on the weight of polyamide of Group I metal halides, e.g., sodium, potassium, lithium with cuprous halides, e.g., chloride, bromide, iodide, hindered phenols, hydroquinones, and varieties of substituted members of those groups and combinations thereof.

The ultraviolet light stabilizers, e.g., up to 2.0 percent, based on the weight of polyamide, can also be those used in addition polymers generally. Examples of ultraviolet light stabilizers include various substituted resorcinols, salicylates, benzotriazoles, benzophenones, and the like.

Suitable lubricants and mold release agents, e.g., up to 1.0 percent, based on the weight of the composition, are stearic acid, stearic alcohol, stearamides, organic dyes such as nigrosine, etc., pigments, e.g., titanium dioxide, cadmium sulfide, cadmium sulfide selenide, phthalocyamines, ultramarine blue, carbon black, etc. up to 50 percent, based on the weight of the composition, of fibrous and particulate fillers and reinforcements, e.g., carbon fibers, glass fibers, amorphous silica, asbestos, calcium silicate, aluminum silicate, magnesium carbonate, kaolin, chalk, powdered quartz, mica, fildspar, etc.; nucleating agent, e.g., talc, calcium fluoride, sodium phenyl phosphinate, alumina, and finely divided polytetrafluoroethylene, etc.; plasticizers, up to about 20 percent, based on the weight of the composition, e.g., dioctyl phthalate, dibenzyl phthalate, butyl benzyl phthalate, hydrocarbon oils, N-normal butyl benzene sulfonamide, ortho and para toluene ethyl sulfonamide, etc. The colorants (dyes and pigments) can be present in an amount of up to about 5.0 percent by weight, based on the weight of the composition.

It is to be understood that in the specification and claims herein, unless otherwise indicated, when in connection with melt-blending, the amount of the polyamide or block copolymer is expressed in terms of percent by weight it is meant percent by weight based on the total amount of these materials which is employed in the melt-blending.

EXAMPLES

To assist those skilled in the art in the practice of this invention, the following Examples are set forth as illustrations, parts and percentages being by weight unless otherwise specifically noted. The molded bars were tested using the following test procedures in the dry-as-molded state:
Notched Izod toughness: at each end ASTM D-256-56
Flexural Modulus: ASTM D-790-58T
Break Strength and Elongation were determined using a thin film micro tensile tester.

EXAMPLES 1-5

Preparation of Modified Block Copolymer by Solution Process

The block copolymer used was a styrene-ethylene/-butylene-styrene containing 29 weight % styrene with a molecular weight of 54,000. This polymer was modified with maleic anhydride in a solution free radical initiated reaction. 7.8 lbs. of polymer, 104.5 grams of maleic anhydride, and 104.5 grams of benzoyl peroxide initator were dissolved in 70 lbs. of cyclohexane. This mixture was transferred to a 15 gallon stainless steel stirred pressure reactor with an oil jacket heater. The reactor contents were heated from ambient temperature to the boiling point of cyclohexane (81° C.) over a two hour time period. The heaters were turned off and the reactor contents were allowed to cool to approximately 40° C. One quart of water and 10 grams of antioxidant Ethyl 330 were then added to the vessel. The mixture was then transferred to a Binks vessel and coagulated by steam stripping. Colorometric titration with potassium methoxide and phenol phthalein indicator was used to determine the maleic anhydride content of the polymer. This modified copolymer was found to contain 0.5 wt % grafted maleic anhydride.

Blending of N6,6 and Solution Modified Block Copolymer

Prior to blending, the modified block copolymer was dried at 1000° C. under vacuum with a nitrogen purge for four hours. The thermoplastic polyamide used in this example was a commercial nylon 6,6 molding grade, Zytel 101 obtained from E. I. DuPont Company. prior to all processing steps, the nylon 6,6 and its blends were dried at 120° C. for four hours under vacuum with a nitrogen purge.

Blends of nylon 6,6 with both unmodified and modified block copolymer were prepared in a 30 mm diameter corotating twin screw extruder. The blend components were premixed by tumbling in polyethylene bags. A stabilizer package, 0.5 wt % of the total material, made up of a 3:1 ratio of a phosphite and hindered phenol antioxidant was included in the composition. The extruder melt temperature profile varied from 270° C. in the feed zone to 285° C. at the die. A screw rpm of 300 was used. The extrudate was pelletized and injection molded into test specimens. The formulations and physical properties are shown in Table 1.

TABLE 1

| Example | Composition (parts by weight) | | | | |
|---|---|---|---|---|---|
| | 1 | 2 | 3 | 4 | 5 |
| Nylon 6,6 | 100 | 80 | 70 | 80 | 70 |
| Unmodified Block Copolymer | — | 20 | 30 | — | — |
| Modified Block Copolymer | — | — | — | 20 | 30 |
| ⅛Dry as Molded Room Temperature Notched Izod (ft.lb./in.) | 0.8 | 1.5 | 1.5 | 19.6 | 26.7 |

The above control examples show that blends of modified block copolymer and Nylon 6,6 exhibit an improvement in impact strength over the Nylon 6,6 alone or blends of Nylon 6,6 with unmodified block copolymer.

EXAMPLES 6-15

Preparation of Modified Block Copolymer by Melt Process

The block copolymer used in the following example was an S-EB-S material with 29% styrene and 54,000 molecular weight. This polymer was melt reacted with maleic anhydride and 2,5-dimethyl-2,5-di(t-butylperoxy)hexane (Lupersol 101) in a 30 mm diameter corotating twin screw extruder.

The reactants were premixed by tumbling in polyethylene bags, and then fed into the extruder. All extrusion conditions except for reactant concentrations were kept constant. The melt temperature was varied from 150° C. in the feed zone to 260° C. at the die. A screw speed of 350 rpm was used.

Samples prepared in the above manner were analyzed for bound maleic by extracting the soluble fraction in refluxing tetrahydrofuran, recovering the soluble fraction by precipitation of the extractant into isopropyl alcohol, and titrating the dried precipitate using the method described in Examples 1–5. Table 2 shows the reactant concentrations examined, as well as analytical results for the material prepared.

PP MA 0.16 and PP MA 1.0—Maleic anhydride grafted polypropylenes with functionalization given in weight percent.

Dry as molded physical properties of blends exemplifying the present invention are given in Table 4.

TABLE 4

| Example | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| Nylon 6,6 | 40 | 40 | 40 | 40 | 40 | 40 | 50 | 50 | 50 | 50 | 50 | 55 | 55 | 75 | 75 |
| Block Copolymer 1 | 20 | 20 | — | 10 | 10 | 20 | — | — | — | — | — | — | — | — | — |
| Modified Block Copolymer Y | — | — | 20 | 10 | 10 | — | — | — | — | 20 | 20 | 10 | 10 | 5 | 5 |
| PP 5520 | 40 | — | — | 40 | — | — | 50 | — | — | 30 | — | 35 | — | 20 | — |
| PP MA 0.16 | — | 40 | 40 | — | 40 | — | — | 50 | — | — | 30 | — | 35 | — | 20 |
| PP MA 1.0 | — | — | — | — | — | 40 | — | — | 50 | — | — | — | — | — | — |
| Tested Dry As Molded: | | | | | | | | | | | | | | | |
| Notches Izod (ft.lb./in.) | 1.2 | 2.7 | 17.0 | 5.7 | 20.9 | 2.1 | 0.8 | 1.7 | 1.5 | 7.4 | 18.3 | 3.3 | 5.9 | 1.4 | 5.7 |
| Flex. Mod. (kpsi) | 195 | 184 | 102 | 163 | 167 | 176 | 299 | 275 | 241 | 146 | 140 | 258 | 257 | 357 | 322 |
| Break Str. (psi) | 4030 | 4870 | 4050 | 4070 | 4380 | 4000 | 5260 | 6630 | 5380 | 4400 | 4300 | 5600 | 5400 | 8900 | 7800 |
| Break Elong. (%) | 5.5 | 22.4 | 139 | 47 | 73 | 30 | 3.9 | 11.9 | 18.1 | 50 | 57 | 23 | 9 | 10 | 7 |

TABLE 2

| Polymer | Wt. % Maleic Anhydride Added | Wt. % Lupersol 101 Added | Wt. % Maleic Anhydride Grafted onto THF Solubles |
|---|---|---|---|
| X | 3 | 0.01 | 0.2 |
| Y | 3 | 0.10 | 1.6 |

Blending of Nylon 6,6 and Modified Block Copolymers Prepared by Melt Process

Blends of Nylon 6,6 with both modified and unmodified block copolymer, were prepared in the manner described in Examples 1–5. The formulations and physical properties are shown in Table 3. The physical properties are for dry as molded material.

EXAMPLES 31 AND 32

In the following examples Zytel ST 801, an EPDM-maleic anhydride toughened nylon blend manufactured by duPont was used.

TABLE 5

| Example | 31 | 32 |
|---|---|---|
| ST 801 | 50 | 50 |
| Block Copolymer 1 | 10 | 10 |
| PP 5520 | 40 | — |
| PP MA 0.16 | — | 40 |
| Tested Dry As Molded: | | |
| Notched Izod (ft.lb./in.) | 3.8 | 12.3 |
| Flex. Mod. (kpsi) | 202 | 186 |

EXAMPLES 33–35

In the following examples modified block copolymer

TABLE 3

| | Composition (parts by weight) Example | | | | | | | | | |
|---|---|---|---|---|---|---|---|---|---|---|
| Component | 6 | 7 | 8 | 9 | 10 | 11 | 12 | 13 | 14 | 15 |
| Nylon 6,6 | 100 | 90 | 80 | 70 | 80 | 90 | 80 | 70 | 80 | 80 |
| Unmodified Block Copolymer | — | 10 | 20 | 30 | — | — | — | — | 10 | 18 |
| Modified Block Copolymer X | — | — | — | — | 20 | — | — | — | — | — |
| Modified Block Copolymer Y | — | — | — | — | — | 10 | 20 | 30 | 10 | 2 |
| Room Temperature ⅛" Notched Izod (ft.lb./in.) | 0.8 | 1.3 | 1.3 | 1.5 | 6.3/18.4* | 3.3 | 19.8 | 22.9 | 22.9 | 3.5 |
| −20 F. ⅛" Notched Izod (ft.lb./in.) | 0.7 | — | — | — | — | 1.2 | 3.5 | 12.4/17.2* | — | — |
| Flexural Modulus (1000 psi) | 439 | — | — | — | — | 409 | 294 | 224 | — | — |
| HDT @ 264 psi(°C.) | 82 | — | — | — | — | 64 | 59 | 60 | — | — |

*Injection molded samples are non-uniform. A/B refers to values for pieces formed close to the mold gate (A) and at the dead end (B).

The above background or control examples again show that blends of modified block copolymer used exhibit an improvement in impact strength over the Nylon 6,6 or blends of Nylon 6,6 and unmodified block copolymer.

Blends According to the Present Invention

EXAMPLES 16–30

In the following examples
Block copolymer 1—S-EB-S 33% styrene M.W. 181,000
PP 5520—Injection molding grade propylene homopolymer from Shell Chemical Z is an S-EB-S block copolymer modified with maleic anhydride and polypropylene as described in U.S. patent application Ser. No. 911,559, filed Sept. 25, 1986, which is hereby incorporated by reference. The ratio of polypropylene to block copolymer in the starting material was 1:3.

TABLE 6

| Examples | 33 | 34 | 35 |
|---|---|---|---|
| Nylon 6,6 | 40 | 40 | 40 |
| Modified Block Copolymer Z | 29 | 29 | 29 |
| PP 5520 | 31 | 16 | — |
| PP MA 0.16 | — | 15 | 31 |
| Tested Dry As Molded: | | | |
| Notched Izod (ft.lb./in.) | 4.9 | 8.7 | 12.6 |

TABLE 6-continued

| Examples | 33 | 34 | 35 |
|---|---|---|---|
| Flex Mod. (kpsi) | 166 | 158 | 157 |

Examples 16–30 show that in nylon blends containing polyolefins and block copolymers, when one or both of the polyolefin or block copolymers are functionalized, the balance of ultimate and low strain properties are significantly improved.

Examples 31 and 32 show that similar improved properties are obtained when the elastomer is maleic anhydride functionalized olefin copolymer.

Examples 33–35 show that improved properties can be also obtained by blending with a modified mixture of polyolefin and elastomer which has been prepared by simultaneously subjecting both components to a functionalization reaction.

The foregoing embodiments are intended to illustrate but not to limit the invention. Various modifications can be made in the invention with departing from the spirit and scope.

What is claimed is:

1. Impact resistant polymeric compositions comprising
   (a) from 1 to 95 percent by weight of a polyamide having a number average molecular weight of at least 5000; and
   (b) from 1 to 95 percent by weight of a poly-α-olefin to which has been grafted an unsaturated monocarboxylic or polycarboxylic acid compound or its derivative;
   (c) from 1–50 percent by weight of a selectively hydrogenated block copolymer of conjugated dienes and vinyl aromatic hydrocarbons to which has been grafted an unsaturated monocarboxylic or polycarboxylic acid compound or its derivative.

2. Impact resistant polymeric compositions of claim 1 wherein the selectively hydrogenated block copolymer is of the formula $B_n(AB)_oA_p$ where n=0 or 1, o=1 to 100, p=0 or 1 to which has been grafted an acid compound or its derivative wherein,
   (1) each A is predominantly a polymerized monoalkenyl aromatic hydrocarbon block having an average molecular weight of about 2,000 to 115,000;
   (2) each B prior to hydrogenation is predominantly a polymerized conjugated diene hydrocarbon block having an average molecular weight of about 20,000 to 450,000;
   (3) the blocks A constituting 5–95 weight percent of the copolymer;
   (4) the unsaturation of the block B is less than 10% of the original unsaturation.

3. The composition of claim 2 wherein the selectively hydrogenated block copolymer has at least 1 B mid block and at least two A end blocks wherein the unsaturation of the A blocks is above 50% of the original unsaturation.

4. The composition of claim 2 wherein the block copolymer is a styrene-butadiene-styrene block copolymer.

5. The composition of claim 2 wherein prior to hydrogenation, the polymeric blocks A are polymer blocks of a monoalkenyl aromatic hydrocarbon.

6. The composition of claim 2 wherein the unsaturation of block B is reduced to less than 5% of its original value and the average unsaturation of the hydrogenated block copolymer is reduced to less than 20% of its original value.

7. The composition of claim 2 wherein A is a polymerized styrene block having an average molecular weight of between about 4,000 and 60,000.

8. The composition of claim 2 wherein B is a polymerized butadiene block having an average molecular weight of between about 35,000 and 150,000, 35%–50% of the condensed butadiene units having 1,2-configuration.

9. The composition according to claim 3 wherein an average of less than about 10% of the monoalkenyl aromatic hydrocarbon units are hydrogenated.

10. The composition according to claim 3 wherein an average of more than about 25% of the monoalkenyl aromatic hydrocarbon units are hydrogenated.

11. The composition of claim 1 wherein the acid compound is maleic acid.

12. The composition of claim 1 wherein the polyolefin is functionalized polypropylene.

13. The composition of claim 1 wherein the polyolefin is functionalized polybutylene.

14. The composition of claim 1 wherein the polyolefin is functionalized high density polyethylene.

15. The composition of claim 1 wherein the polyolefin is functionalized low density polyethylene.

16. The composition of claim 1 wherein the polyamide is present at between about 10 and about 70 percent by weight.

17. The composition of claim 1 wherein the polyamide is present at between about 15 and about 45 percent by weight.

18. The composition of claim 1 wherein the polyamide is nylon 6,6.

19. A composition of claim 1 wherein the polyamide resin is selected from the group consisting of polyhexamethylene adipamide, polyhexamethylene sebacamide, polycaprolactam, polyhexamethylene isophthalamide, polyhexamethylene tere-co-isophthalamide and mixtures and copolymers of the above.

20. The composition of claim 1 wherein the block copolymer is present at between about 15 and 35 percent by weight.

21. The composition of claim 1 wherein the block copolymer is present at between about 10 and 25 percent by weight.

22. The composition of claim 1 wherein the polyolefin is present between about 10 and 70 percent by weight.

23. The composition of claim 1 wherein the polyolefin is present between about 15 and 45 percent by weight.

24. The composition of claim 1, wherein the poly-α-olefin is functionalized with from about 1 to about 10 percent by weight of the acid compound.

25. The composition of claim 24, wherein the block copolymer is functionalized with from about 0.2 to about 20 percent by weight of the acid compound.

* * * * *